United States Patent [19]
Alvarez

[11] 3,815,431
[45] June 11, 1974

[54] CONNECTING ROD ASSEMBLY

[76] Inventor: Bernard V. Alvarez, Rt. 1, Box 32, Inman, S.C. 29349

[22] Filed: Dec. 1, 1972

[21] Appl. No.: 311,326

[52] U.S. Cl. .............................. 74/579 E, 74/588
[51] Int. Cl. .......................... F16c 7/02, F16c 7/08
[58] Field of Search ............... 74/579 E, 579 R, 588

[56] References Cited
UNITED STATES PATENTS
| | | | |
|---|---|---|---|
| 1,355,261 | 10/1920 | Pribil | 74/588 |
| 2,860,527 | 11/1958 | Fritz | 74/588 |
| 3,482,468 | 12/1969 | DeBiasse | 74/579 |

FOREIGN PATENTS OR APPLICATIONS
| | | | |
|---|---|---|---|
| 881,327 | 4/1943 | France | 74/579 E |

Primary Examiner—Samuel Scott
Assistant Examiner—F. D. Shoemaker
Attorney, Agent, or Firm—Wellington M. Manning, Jr.

[57] ABSTRACT

A connecting rod assembly of the type for use in an internal combustion engine is disclosed herein. The rod comprises a shank having a piston pin bearing receiving opening at one end and a large bearing receiving area at an opposite end. A connector passageway is provided adjacent the large bearing receiving area and a removable U-shaped connector is passed therethrough. The connector is then secured to a cap which provides a complementary large bearing receiving area so as to define a crank shaft bearing receiving opening in the lower end of the rod assembly. The U-shaped connector affords greater strength to the rod when subjected to the compressive and tensile stresses experienced during operation of the internal combustion engine. Moreover, a rod produced at least in part from die cut metal plates incorporating the U-shaped connector is also provided.

7 Claims, 6 Drawing Figures

CONNECTING ROD ASSEMBLY

BACKGROUND OF THE INVENTION

Connecting rods for internal combustion engines have often been blamed for the majority of engine failures, especially in high performance situations such as stock car racing and the like. In this regard, the connecting rod is exposed to four basic types of stress during operation in which its transmits a reciprocating motion of piston to a rotary motion at the crank shaft. These types of stress include tension, compression, bending, and torsion. Of the four, the tensile and compressive stresses are the greatest.

The automotive industry has made numerous attempts to design a connecting rod that will withstand the stresses encountered during operation of the engine. Primarily, such attempts have been designed to control breakage of the rod and/or distortion or flexing of the rod at critical areas. The geometric shape of the connecting rod has been found to be unimportant, though at particular section it has been found that cross section so as to avoid overstressing is an important factor. Numerous expediencies have heretofore been undertaken so as to avoid distortion or breakage of the rod, all of which are believed to have been unsuccessful due to the number of broken connecting rods currently being experienced. Moreover, when a connecting rod breaks, the breakage per se, is not the major problem. Instead, the real problem is created by additional damage to the piston, the crank shaft and the like.

In seeking to overcome the problems existent with connecting rods, the prior art has been directed to various and sundry techniques for improving the strength of the rod in the particular areas where stress is likely to occur. For example, connecting rods have been manufactured where the cross section of the shank is rectangular, has an I-shaped cross section or has an H-shaped cross section. Moreover, various and sundry techniques have been tried to reinforce the rod, especially the area surrounding the crank shaft bearing that is received at the large end of the rod. In this regard, while the connecting rod is normally brought together with a rod cap and secured thereto by cap bolts, these bolts have been placed at various and sundry locations around the periphery of the bearing so as to rigidify that portion of the rod. Additionally, various types of connectors have been designed for joining the main section of the rod to the cap so as to improve the overall strength thereof. The lack of commercial existence on today's market of these particular approaches to improving the connecting rod structure, speaks for the inability of the prior art to overcome the problems.

As set forth below, numerous of the prior techniques are disclosed in the patented prior art. There is, however, no teaching or suggestion of the present invention in the prior art which is exemplified by U.S. Pat. Nos. 17,265 to McKone; 1,308,992 to Pribil; 1,326,421 to Pribil; 1,355,251 to Pribil; 1,434,904 to Mansfield; 1,704,393 to Leary; 1,746,491 to Morgan; 1,772,966 to Solver; 1,959,279 to Stearns; 2,057,897 to Jencick; 3,238,811 to Longstreth; 3,285,098 to Beveridge; and 3,411,378 to Borgeaud.

SUMMARY OF THE INVENTION

It is an object of the present invention to provide an improved connecting rod for an internal combustion engine.

Still further, another object of the present invention is to provide a new and improved means for providing a reinforced connecting rod so as to avoid breakage about the crank shaft bearing receiving area of the rod.

Generally speaking, the present invention teaches a connecting rod assembly comprising a shank, said shank having a small bearing receiving opening at one end thereof and a large semi-circular bearing receiving area at an opposite end thereof, said semi-circular bearing receiving area having a connector passageway completely therearound and adjacent thereto, a cap removably secureable to said shank, said cap having a semi-circular bearing receiving area thereon, said cap bearing receiving area mating with said shank bearing receiving area to define a crank shaft bearing receiving opening, said cap further having a connector receiving opening on each side of said bearing receiving area; and a U-shaped connector received in said connector passageway and said connector openings and being removably secured therein.

More specifically, while the connecting rod of the present invention may be machined from a solid piece of stock, may be forged or may be assembled from individual pieces of steel, the preferred cross sectional configuration of the shank is generally H-shaped where flat sections are provided on each side of the connecting rod with a support positioned in the center thereof and extending a majority of the length thereof. The shank of the rod has an opening passing therethrough to receive a U-shaped connector, the opening being parallel to the side sections and perpendicular to the center support. The opening is preferably immediately adjacent the semi-circular bearing receiving area of the shank. Moreover, the bearing surface receiving area of the shank is further provided with a slot or the like along each side thereof. The slots along the sides connect with the opening so as to define a connector passageway. The cap is then mated with the bearing receiving area of the shank with the connector passing through openings provided therefor. The connector is then secured by nuts or the like so as to removably secure the cap to the shank and rigidify the connecting rod assembly.

Bearing surfaces for the wrist pin, piston pin, crank shaft or the like as used with the connecting rod of the present invention may be integral with the particular portions of the rod or may be inserted after manufacture of the rod. In any event, the particular bearing surfaces are not a part of the present invention and are left to one skilled in the art to be provided as desired.

Insofar as fabrication of a rod from sheet metal is concerned, the side sections may be provided by plates die cut to the appropriate shape while being simultaneously formed so as to provide the small bearing surface receiving opening at one end thereof and the large semi-circular bearing receiving area at the opposite end thereof. In forming the large semi-circular bearing receiving area of the rod, a portion of the side plates may be bent inwardly whereby, when the two plates are joined the space therebetween defines a portion of the connector passageway. The middle strut that is used to secure the side plates to each other further rigidifies the structure and simultaneously defines the width of the connector passageway adjacent the semi-circular bearing surface receiving area.

The U-shaped connector preferred according to the present invention is preferably a U bolt manufactured from a high performance steel alloy which will resist distortion and breaking during operation of the internal combustion engine. Preferably, the U bolt is threaded at the ends and receives threaded nuts therearound so as to secure the rod cap to the shank.

DESCRIPTION OF THE PREFERRED EMBODIMENTS

Figure 1:
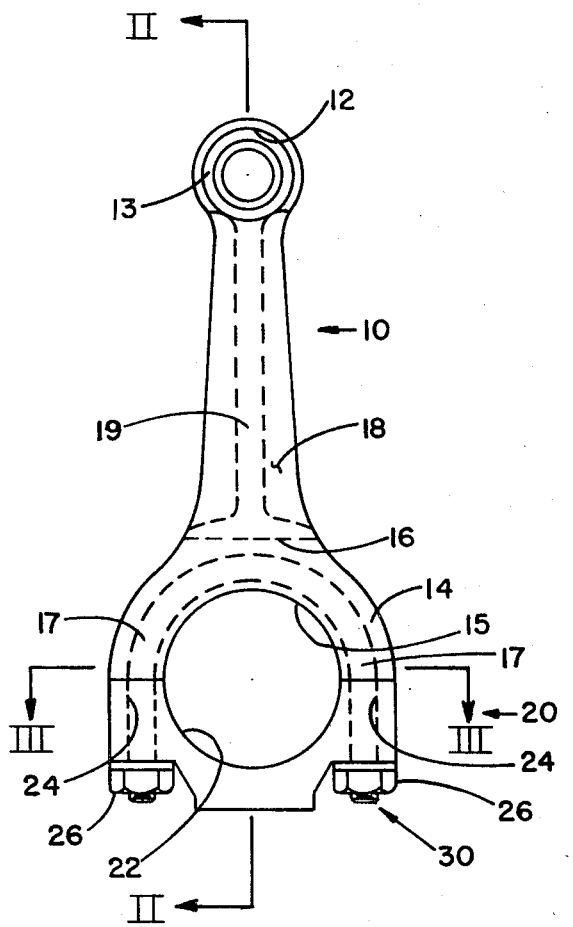
FIG. 1 is a front elevational view of a connecting rod assembly according to the present invention.
Figure 2:
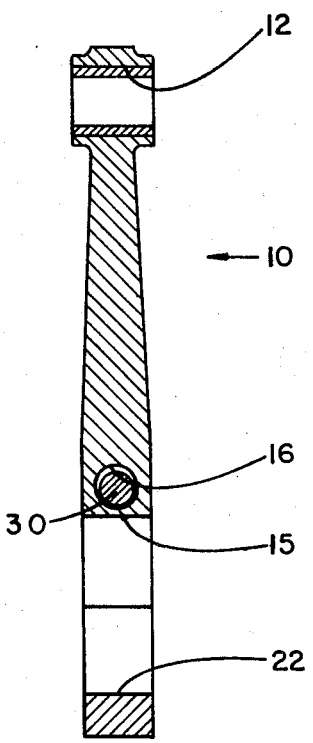
FIG. 2 is a vertical cross sectional view of the connecting rod assembly as shown in FIG. 1 taken along lines II—II.
Figure 3:
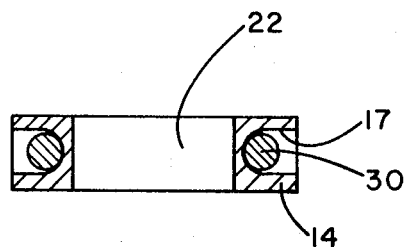
FIG. 3 is a horizontal cross section of the connecting rod assembly as shown in FIG. 1 taken along lines III—III.
Figure 4:
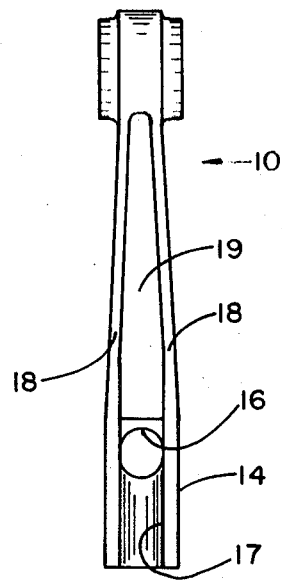
FIG. 4 is a side elevational view of a shank portion of a connecting rod assembly according to the teachings of the present invention.

Referring to FIGS. 1 through 4, a preferred embodiment of the connecting rod assembly of the present invention will be described in detail. The connecting rod assembly is comprised of a shank generally indicated as 10, a cap generally indicated as 20 and a connector generally indicated as 30. Shank 10 has a small bearing surface receiving opening 12 at one end thereof, said opening receiving a bearing surface 13 therein for securement to a wrist pin (not shown) at a piston. At the opposite end of shank 10 is an enlarged area 14 having a semi-circular bearing surface receiving area 15 thereat. Shank 10 further has a connector receiving opening 16 extending therethrough and slots 17 in communication with opposite sides of opening 16 and extending arcuately around semi-circular area 15. Opening 16 and slots 17 define a passageway for connector 30 and have a predetermined radius such that connector 30 may be conveniently inserted therein and removed therefrom.

Furthermore, according to a preferred embodiment of the present invention, shank 10 is made up of a pair of side sections 18 with a middle section 19 positioned therebetween and securing sections 18 to each other, thus defining an H-shaped cross section. As will be discussed in detail hereinafter, shank 10 may be machined or forged from solid stock or may be fabricated from sheet metal.

Rod cap 20 also has a semi-circular bearing receiving area 22 thereon and has an opening 24 on each side of the bearing surface receiving area 22 to receive a connector 30 when shank 10 and cap 20 are assembled.

As thus shown in the Figures, the connecting rod assembly of the present invention is receivable around a crank shaft with cap 20 being secured on one side of the crank shaft and shank 10 on the opposite side. Connector 30 which is received in opening 16 and slots 17 of shank 10 is passed through openings 24 of cap 20 and secured in place by threaded nuts 26 or the like.

The connecting rod according to the present invention is reinforced at those areas where rupture or distortion is most likely to occur. For example, connector 30 surrounds the semi-circular bearing surface receiving area 15 of shank 10 which is most susceptible to rupture through an operation of the engine in which the rod is employed. By surrounding the bearing surface receiving area 15, and properly securing connector 30, a more rigid rod structure is provided. Moreover, the use of the U-shaped connector 30 in conjunction with the H-shaped cross section of the shank as shown in the Figures mainly transmits the torsional and compressive forces across sections 18. The forces are thereby more evenly distributed over the entire connecting rod and no one area is subjected to excessive forces to the point of rod rupture.

Figure 5:
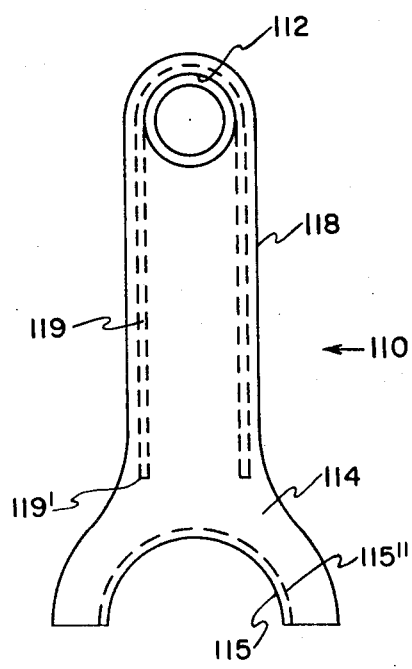
FIG. 5 is a front elevational view of a further embodiment of the present invention.
Figure 6:
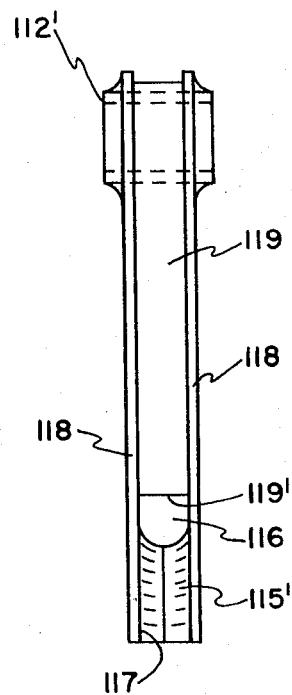
FIG. 6 is a side elevational view of the embodiment shown in FIG. 5.

Referring to FIGS. 5 and 6, a further embodiment of the present invention will be described. As mentioned above, the shank of the rod assembly may be fabricated from sheet metal and used in conjunction with conventional rod caps and the U-shaped connectors of the present invention. A shank 110 is generally indicated having side plates 118 and a center section 119 secured therebetween to form a unitizied structure. Side plates 118 have piston pin bearing receiving openings 112 therein, said openings being in alignment with each other to receive a bearing (not shown) therein. Preferably, an elongated tubular element 112' is received in openings 112 and a bearing is received internally along element 112'. Element 112' may be secured in openings 112 as desired. Center section 119 is preferably an inverted U-shaped element as illustrated, extending around piston pin bearing receiving opening 112 and extending downwardly along the length of side plates 118. Center section 119 terminates above an enlarged area 114 of shank 110 that has a bearing surface receiving area 115 therein.

Plates 118 at bearing surface receiving area 115 have been deformed inwardly providing shoulders 115' thereat, said shoulders 115' extending around area 115.

Assembly of plates 118 and center section 119 by welding or other suitable means defines a connector receiving opening 116 through shank 110, said opening being defined by the terminal ends 119' of member 119 and the deformed shoulders 115' of area 115. Likewise, slots 117 are defined on each side of area 115 by side plates 118 and shoulders 115'. Opening 116 and slots 117 continue to define a connector passageway around area 115. Shank 110 can thus be employed with a cap 20 and U-shaped connector 30 as described with respect to FIGS. 1 and 2 to provide an improved connecting rod assembly.

While as shown in FIGS. 5 and 6, shoulders 115' of bearing receiving area 115 may cooperate with side plates 118 to define connector receiving slots 117, a further embodiment of the present invention utilizes shoulders 115' to support a curved plate 115'' (shown in phantom in FIG. 5) around bearing receiving area 115. In this embodiment curved plate 115'' passes around slots 117 and through opening 116 and provides a continuous surface on which a connector is received when the rod is assembled. Curved plate 115'' may be secured to shoulders 115' and side plates 118 as desired to provide a unitized structure.

Insofar as materials of manufacture are concerned, connecting rods according to the present invention are preferably produced from high performance metals or metal alloys such as are commonly in existence today.

Such rods are made from carbon steel with various percentages of carbon, and in some cases carbon alloyed with nickel, chrome, molybdenum or the like. Likewise, the connector should be manufactured of a high performance steel so as to resist distortion and rupture under the application of large forces thereon.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A connecting rod assembly comprising:
   a. a shank, said shank having a small bearing receiving opening at one end thereof and a large semi-circular bearing receiving area at an opposite end thereof, said semi-circular bearing receiving area having a connector passageway therearound and adjacent thereto, said passageway including an opening through said shank and an open slot on each side of said bearing receiving area;
   b. a cap removably securable to said shank, said cap having a bearing receiving area thereon, said cap bearing receiving area mating with said shank bearing receiving area to define a crank shaft bearing receiving opening, said cap further having a connector receiving opening on each side of said bearing receiving area; and
   c. a U-shaped connector received in said connector passageway and said connector receiving openings and removably secured therein.

2. A connecting rod assembly as defined in claim 1 wherein said slots and said opening are continuous along said area.

3. A connecting rod assembly as defined in claim 2 wherein said slots and said opening are arcuate in shape.

4. A connecting rod assembly as defined in claim 1 wherein said connector is threaded at the ends thereof and wherein said connector receives threaded locking means thereon to removably secure said cap to said shank.

5. A connecting rod assembly as defined in claim 1 wherein said shank is comprised of two plates, said plates being secured to each other by a central member and wherein said shank has an H-shaped cross section between said bearing receiving opening and area.

6. A connecting rod assembly as defined in claim 5 wherein said central member is an inverted U-shaped member extending around said bearing receiving opening and downwardly on both sides thereof along said plates.

7. A connecting rod assembly as defined in claim 5 wherein said plates have inwardly deformed shoulders around said bearing receiving area, said shoulders defining said connector receiving slots along said area.

* * * * *